United States Patent
Gersh et al.

(10) Patent No.: US 11,551,268 B2
(45) Date of Patent: *Jan. 10, 2023

(54) PROSPECT SELECTION FOR DIRECT MAIL

(71) Applicant: PebblePost, Inc., New York, NY (US)

(72) Inventors: Lewis Gersh, New York, NY (US);
Robert Victor, New York, NY (US);
Thomas C. Gibbons, Brooklyn, NY (US); Adam C. Solomon, East Setauket, NY (US)

(73) Assignee: PebblePost, Inc., New York, NY (US)

( * ) Notice: Subject to any disclaimer, the term of this patent is extended or adjusted under 35 U.S.C. 154(b) by 55 days.

This patent is subject to a terminal disclaimer.

(21) Appl. No.: 16/149,805

(22) Filed: Oct. 2, 2018

(65) Prior Publication Data
US 2019/0102805 A1 Apr. 4, 2019

Related U.S. Application Data

(60) Provisional application No. 62/566,932, filed on Oct. 2, 2017.

(51) Int. Cl.
*G06F 21/62* (2013.01)
*G06F 16/22* (2019.01)
*G06Q 30/02* (2012.01)

(52) U.S. Cl.
CPC ..... *G06Q 30/0271* (2013.01); *G06Q 30/0276* (2013.01); *G06F 16/2255* (2019.01); *G06F 21/6254* (2013.01)

(58) Field of Classification Search
CPC .................. G06Q 30/0271; G06Q 30/0276
See application file for complete search history.

(56) References Cited

U.S. PATENT DOCUMENTS

| 2002/0004745 A1* | 1/2002 | Bascobert | G06Q 30/0207 705/14.1 |
| 2005/0273842 A1* | 12/2005 | Wright | G06F 21/6254 726/1 |
| 2007/0067297 A1* | 3/2007 | Kublickis | G06Q 20/29 |

(Continued)

OTHER PUBLICATIONS

U.S. Appl. No. 15/382,086, filed Dec. 16, 2016, Gersh et al.
PCT International Search Report and Written Opinion, PCT Application No. PCT/US18/53942, dated Dec. 26, 2018, 12 pages.

*Primary Examiner* — Dipen M Patel
(74) *Attorney, Agent, or Firm* — Fenwick & West LLP

(57) ABSTRACT

A collateral generation system generates and sends physical direct mail to one or more users on behalf of an entity with which the users have interacted. The collateral generation system can send physical direct mail to prospects, who may not have a prior relationship with the entity. In general, prospects would not normally be sent mailings because the entity lacks some primary information about the entity, such as an address or sufficient identifying information to obtain an address of the entity. The collateral generation system identifies prospects based on activity online and obtains mailing addresses of the prospects from an identification service while retaining user anonymity of those prospects. The collateral generation system generates collateral, which may be personalized for a defined block group of prospects (e.g., individuals or organizations), and the collateral is sent as physical mail to the prospects on behalf of the entity.

15 Claims, 9 Drawing Sheets

(56) References Cited

U.S. PATENT DOCUMENTS

| | | | |
|---|---|---|---|
| 2007/0282796 A1* | 12/2007 | Evenhaim | G16H 50/70 |
| 2008/0071630 A1* | 3/2008 | Donahue | G06Q 30/02 |
| | | | 705/7.11 |
| 2009/0132670 A1* | 5/2009 | Syiek | H04L 51/12 |
| | | | 709/206 |
| 2010/0094758 A1* | 4/2010 | Chamberlain | G06Q 10/06375 |
| | | | 705/50 |
| 2011/0060905 A1* | 3/2011 | Stack | G06Q 30/02 |
| | | | 713/167 |
| 2011/0231246 A1* | 9/2011 | Bhatia | G06Q 30/00 |
| | | | 705/14.43 |
| 2012/0011068 A1* | 1/2012 | Dearing | G06F 16/245 |
| | | | 705/50 |
| 2014/0143052 A1* | 5/2014 | Stryker | G06Q 30/0255 |
| | | | 705/14.53 |
| 2015/0088662 A1* | 3/2015 | Noller | G06N 20/00 |
| | | | 705/14.66 |
| 2015/0379303 A1* | 12/2015 | LaFever | G06F 21/6254 |
| | | | 726/28 |
| 2016/0342811 A1* | 11/2016 | Whitcomb | G06F 16/245 |
| 2016/0371740 A1* | 12/2016 | Heiser, II | G06F 21/6254 |
| 2017/0178270 A1* | 6/2017 | Gersh | G06Q 30/0255 |
| 2022/0245539 A1* | 8/2022 | Clearwater | G06F 15/76 |

\* cited by examiner

PROSPECT SELECTION FOR DIRECT MAIL

CROSS REFERENCE TO RELATED APPLICATION

This application claims the benefit of U.S. Provisional Application No. 62/566,932, filed on Oct. 2, 2017, which is incorporated by reference in its entirety.

TECHNICAL FIELD

This disclosure relates to the field of automated collateral generation and transmission.

BACKGROUND

This disclosure generally relates to generating and sending personalized direct mail. A typical process for sending direct mail to a multitude of recipients takes up to 24 weeks and will generally deliver the same piece of mail to each recipient of the direct mail. In many cases, the direct mail is completely designed well in advance of mailing including any creative elements as well as any associated offers or promotions, and is intended to be generic or common to each future recipient of the direct mail. The recipient list is typically a mailing list of known customers. Addresses of the direct mail recipients are stored in the mailing list and can be added to preprinted direct mail items. Currently, traditional direct mail systems separate the printing and addressing of direct mail into two distinct processes, often performed at two different vendors. First, generic templates of the direct mail are printed without addresses or other personalized information. Next, addresses and fixed personalized details, such as unique promotional codes or names, of the customers in the mailing list are added to the already printed templates and subsequently sent for mailing.

However, typical direct mail systems are not set up to produce different mailings to different subsets of a mailing list. Further, traditional direct mail systems do not enable sending direct mail to prospects that are not already known to the mailer. Instead, typical direct mail systems receive a customer list, and can send direct mail only to the known customers included on the received list. Therefore, existing direct mailing systems are slow and inflexible, both in terms of content and in the selection of recipients to receive direct mail. Furthermore, after mail is delivered, there is no way to directly determine the outcome of the mailing, so the available statistics of reception or response rate for mail sent by a traditional direct mail system have limited accuracy.

DETAILED DESCRIPTION

Figure 1:
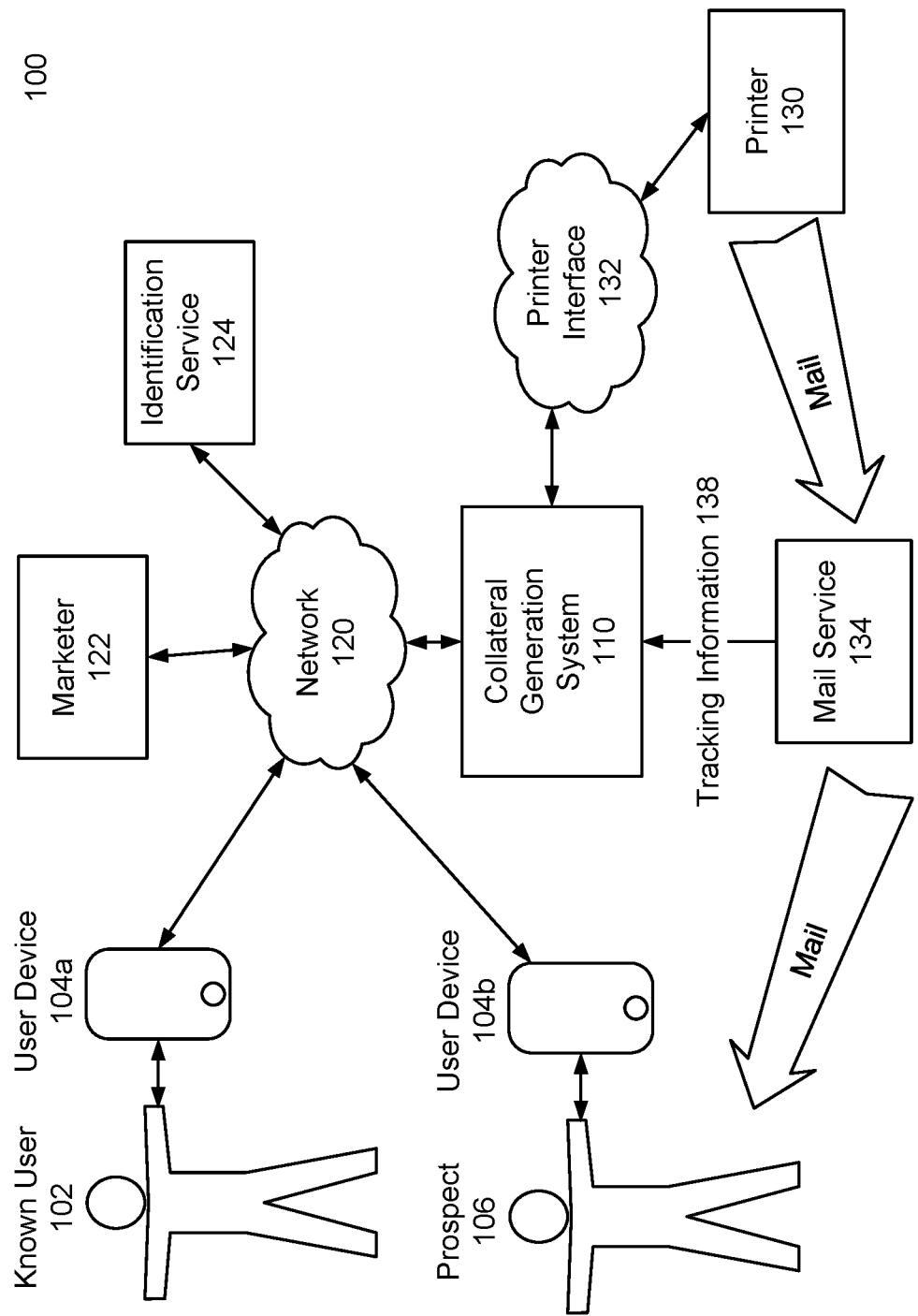
FIG. 1 is a block diagram illustrating an example environment in which a collateral generation system operates, according to one embodiment.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

Configuration Overview

In some example embodiments, a collateral generation system generates and sends physical direct mail to one or more users on behalf of a marketer with which the users have interacted. The collateral generation system can send physical direct mail to known users, who have some prior relationship with the marketer, or to prospects, who may not have a prior relationship with the marketer. For example, known users can include prior customers of the marketer, individuals who have signed up for the marketer's mailing list, customers of a related marketer, or other people or potential addressees (e.g., companies, non-profits, or other types of entities) for whom the marketer has a mailing address and/or other identifying information. As described herein, the collateral generation system can also send mail to prospects that would not ordinarily be sent mailings by or on behalf of the marketer. In general, prospects are individuals or other addressees that would not normally be sent mailings because the marketer lacks sufficient information about the prospect, such as an address or sufficient identifying information to obtain an address of the prospect (as opposed to, for example, the prospect opting out of mailings). For example, some prospects may be users who have viewed or expressed interest in the marketer (or a product of the marketer), but who have not provided their information to the marketer (for example, in the case of a potential first-time customer). However, as the prospect have not provided their mailing information to the marketer, the collateral generation system can maintain the anonymity of the prospects when sending the direct mail. The collateral generation systems described herein identify prospects based on activity online, e.g., users' web activity, and then obtain the mailing addresses of the prospects from an internal or external identification service. The collateral generation systems generate collateral, which may be personalized for a defined block group of prospects (e.g., individuals or organizations) while retaining user anonymity of those prospects, and the collateral is sent as physical mail to the prospects on behalf of a marketer.

The collateral generation system also may receive and analyze feedback on the physical collateral's delivery and reception. Physical direct mail (hereinafter, physical collateral) can be a card, mailer, catalog, letter, envelope, or package, or other physical object sent, often via a mail and/or courier service (e.g. the United States Postal Service, FEDERAL EXPRESS, UNITED PARCEL SERVICE), to a physical mailing address of a user (hereinafter a "mailing"). Each physical collateral item can be associated with one or more marketers representing the source of the mailing and a collateral objective describing the subject or intended effect of the mailing. In some example embodiments, collateral objectives are products, services, advertising campaigns, or promotional offers determined to be of interest to the user, with the intended effect to inform or remind the user about the product, service, or offer. However, a collateral objective can be any suitable reason for sending physical collateral to a user. For example, a collateral objective can be an advertising campaign intended to boost sales of a specific product or category of products sold by a marketer. Further, a physical collateral item can be associated with an incentive such as a discount or promotion code. Each physical collateral item can be personalized or customized to reflect both an associated user and collateral objective. For example, a personalized physical collateral item can be a postcard sent to the mailing address of a user. In this example, the postcard can depict an image of a product previously viewed by, but not purchased by, the user and include a promotional code for free shipping on the product. Physical collateral items can be associated with a marketer responsible for the content of the physical collateral, such as an online retailer or other entity. In some implementations, a single physical collateral item can be associated with multiple marketers, for example a catalog or postcard featuring products offered at multiple different retailers.

The specific layout and content of a physical collateral item can be described in a plan or representation (hereinafter a "physical collateral plan") from which the physical collateral can be generated, for example by a large scale printer able to generate bulk quantities of physical collateral at high speeds. In some implementations, a physical collateral plan is a file such as a Portable Document File (PDF) fully describing the physical collateral and including addressing and tracking information. In other implementations, a physical collateral plan can comprise a group of files that fully describe the physical collateral, for example, a PDF template and a text file containing content of fields within the template. In some implementations, one physical collateral plan contains details on many different physical collateral items to be sent to different users. Similarly, multiple physical collateral plans can be combined to form a larger physical collateral plan associated with multiple physical collateral items.

Further, physical collateral items may include elements or features facilitating interaction with a computer, such as a printed quick response (QR) code or embedded radio frequency identification (RFID) tag. Physical collateral items may also interface with a computer by means of electrically activated paper, by electrically active elements printed in the paper on which the physical collateral item is printed, or by any other suitable method.

Example Environment

FIG. 1 is a block diagram illustrating an example environment in which a collateral generation system operates, according to one embodiment. The environment 100 of FIG. 1 includes a known user 102 and corresponding user device 104a, prospect 106 and corresponding user device 104b, a collateral generation system 110, a network 120, a marketer 122, an identification service 124, printer 130, a printer interface 132, and a mail service 134. For clarity, FIG. 1 shows only one known user 102, prospect 106, marketer 122, printer 130, and mail service 134, and only two user devices 104 and 104b. However, embodiments can include any number of known users, user devices, prospects, marketers, printers, and user devices. In addition, it is noted that the marketer 122, identification service 124 and printers 130 may correspond to computing devices (e.g., servers, web sites, communication software) associated with those entities and that interoperate with the example environment.

Known users 102 and prospects 106 are individuals or other addressees (e.g., households or businesses) who interact with one or more marketers 122 (herein, collectively referred to as "users"). Users may interact with marketers 122 and the collateral generation system 110, for example through an account of a user. A user can communicate with the marketer over the network 120 through an associated user device 104a or 104b. Users 102 and 106 may identify themselves directly, e.g., by signing into an online account or by providing identifying information such as an email address. Alternatively, users 102 and 106 may identify themselves indirectly through an Internet Protocol (IP) address, cookies, or by any other suitable manner. Users may also be associated with a mailing address at which they can receive physical collateral from a mail service 134.

A known user 102 may be a user whose mailing address is previously known to a marketer 122. For example, known users 102 may include existing customers who have previously purchased products or services from the marketer 122. From the prior purchases, the shipping or billing addresses of the existing customers are known to the marketer 122. Similarly, known users 102 may have voluntarily provided their mailing address to the marketer 122, such as to subscribe to a service or to sign up for an account. By contrast, the mailing addresses of prospects 106 are not known to the marketer 122. In some example embodiments, other information about prospects 106 is known to the marketer 122, for example, an electronic mail (email) address, general geographic location, or other demographic information about the prospect 106. Prior to mailing a prospect 106, the appropriate mailing address can be determined by the collateral generation system 110, for example, through requesting information from the identification service 124. In some embodiments, a user may be a known user 102 with respect to one marketer 122 and a prospect 106 with respect to a different marketer. Herein, known users 102 and prospects 106 will be described with respect to one marketer 122, but it should be understood that the collateral generation system 110 can be connected to many marketers 122.

A user device 104 can be a mobile phone, smart phone, laptop or desktop computer, tablet, or any other computing device that users 102, 106 use to interface with web servers or systems associated with marketers 122 and/or the collateral generation system 110. It is noted that the user devices, as well as other devices described herein (e.g., marketer or publisher devices, or the collateral generation system 110) include computing components such at least one processor (and/or controller), a memory, a network interface, and/or a storage. These devices include operating systems that are stored in memory and/or storage and used with computer programs comprised of instructions (also stored in memory and/or storage) and executable by the processor. By way of example, the memory may be a temporary memory (e.g., random access memory). The storage may be a non-transitory storage device (e.g., a flash memory, magnetic disk). The instructions (e.g., program code or software) stored in the memory and/or storage, which are executable by the processor, may correspond to the modules and/or processes described herein. By way of example, the modules may be program code configured to have the processor perform particular functionality as described. Also by way of example, the processes may correspond to steps executed by the processor to enable a particular output.

User devices 104a and 104b may be connected to the marketers 122 and collateral generation system 110 over the network 120, and may be associated with a specific user or users (either known users 102 or prospects 106). Users 102 and 106 can interact over a user device 104 using an online account. User devices 104a and 104b can each be associated with a device ID that uniquely identifies the device and information originating from the device, for example when the user device 104 communicates with a marketer 122 or the collateral generation system 110. In some implementations, user devices 104a and 104b are able to collect user activity data when a user interacts with a marketer 122. Collected user activity data can be transmitted to the collateral generation system 110. For example, a cookie or JavaScript code embedded on a website of a marketer 122 can transmit user browsing information or other user activity information from a user device 104 to the collateral generation system 110.

The collateral generation system 110 may generate physical collateral plans based on received information, according to the embodiment of FIG. 1. The collateral generation system 110 can receive information from any number of users, user devices 104a and 104b, marketers 122, and identification services 124. Using the received information, the collateral generation system 110 may determine appropriate physical collateral plans to be rendered into physical collateral by a printer 130. For example, the collateral generation system 110 may determine appropriate users to be sent physical collateral and similarly determine the content for each physical collateral item. The collateral generation system 110 also may receive tracking information about previously sent physical collateral from a mail service or services 134. The collateral generation system 110 will be described in greater detail below in relation to FIG. 2.

A network 120 may have any combination of local area and wide area networks and can be wired, wireless, or a combination of wired and wireless networks. For example, a network 120 may use standard communication protocols, for example hypertext transport protocol (HTTP) or transmission control protocol/Internet protocol (TCP/IP) over technologies such as Ethernet, 4G, or a digital subscriber line (DSL). In some implementations, data transmitted over the network 120 can be encrypted.

A marketer 122, in the embodiment of FIG. 1, may be any entity that communicates with users, such as known users 102 and prospects 106. Marketers 122 may use or maintain a web server or other system to interact with users electronically, for example through a user device 104 associated with a user. Interactions between users and marketers 122 may correspond to interactions between an online account associated with the user and the online system of the marketer 122. In some embodiments, a marketer 122 may be associated with a set of collateral objectives such as products, services, events, promotional offers, notices, or other information potentially of interest to a user. Retailers, online retailers, service providers, and websites are all examples of marketers 122. A marketer 122 may provide the collateral generation system 110 with information about users, creative elements to incorporate into physical collateral, and desired collateral objectives. For example, a marketer 122 may provide the collateral generation system 110 with information about user interactions with the marketer 122, such as shipping addresses of known users 102 from past purchases with the marketer 122, user browsing information, or user demographic information. Marketers 122 also may provide product photos and other graphics and a list of products or offers selected as collateral objectives to the collateral generation system 110. Additionally, a marketer 122 may set overall goals (for example, "campaign goals") for physical collateral mailings in the collateral generation system 110, e.g., as part of a larger marketing campaign. For example, a marketer 122 may set a quota or target for total mailings, mailings with a certain collateral objective, responses, conversions, or any other suitable goal. In some embodiments, the marketer 122 receives information or analysis about generated physical collateral from the collateral generation system 110, such as analysis information on completed physical collateral mailings. In some implementations, a marketer website incorporates integration code from the collateral generation system 110. When a user device 104a or 104b loads the website, the integration code can cause the user device 104a or 104b to send user activity information about users 102 or 106 interacting with the marketer website to the collateral generation system 110. Alternatively, the integration code can run at a web server hosting the website or other service, such as an app, loaded on the user device 104a or 104b.

In the embodiment of FIG. 1, an identification service 124 is a service which can provide mailing addresses for one or more prospects 106 to the collateral generation system 110. The identification service 124 is configured to provide information on a defined set of prospects (e.g., individuals or organizations) while retaining the anonymity of those prospects. In some implementations, the identification service 124 may be or integrate with an outside vendor which can provide additional information associated about a prospect 106 (for example, an IP address or email address) with a mailing address for the prospect 106. In some implementations, the identification service 124 can provide a user identification (ID) for a prospect 106 or known user 102 based on a request from the collateral generation system 110 containing information about the user. In some implementations, the identification service 124 is a database or other information store integrated into or maintained by the collateral generation system 110. For example, the identification service 124 can be a database of mailing addresses pooled from many marketers 122 associated with the collateral generation system 110.

In the example embodiment of FIG. 1, printers 130 are devices or systems able to generate large quantities of physical collateral based on received instructions from the collateral generation system 110. A printer 130 may be a device directly able to generate physical collateral, such as a large scale printer able to generate bulk qualities of unique physical collateral at high speeds. A printer 130 may also be a company operating one or more such devices, for example a print shop controlling many large scale printers. For example, a printer 130 may receive a physical collateral plan describing a physical collateral item that may be generated based on the physical collateral plan. Printers 130 also may deliver physical collateral to an appropriate mail service 134 to be sent to its final destination. Each printer 130 can be associated with a different mail service 134. In some embodiments, printers 130 are integrated into the collateral generation system. In the embodiment of FIG. 1 a single printer 130 is shown, but any number of printers may communicate with the collateral generation system 110. The printer interface 132 may be any suitable network or networks over which collateral generation system 110 may communicate with printers 130 such as over the Internet, direct Ethernet connection, or any other suitable network. For example, the printer interface 132 may be the same network as network 120. In some implementations, software features or modules allowing printers 130 to directly communicate with the collateral generation system 110 are integrated into the OEM software of a printer device.

In the embodiment of FIG. 1, a mail service 134 may be capable of delivering physical collateral items to a mailing address of a user. For example, the mail service 134 may be the United States Postal Service (USPS), UNITED PARCEL SERVICE (UPS), FEDERAL EXPRESS (FEDEX), or any other suitable mail (or courier) carrier. A mail service 134 can receive physical collateral for delivery from one or more printers 130. According to some example embodiments, mail carriers may offer a discount if mail is received pre-sorted, such as USPS carrier route or by geographical area. In some implementations, the mail service 134 provides tracking information 138 to the collateral generation system 110. Tracking information 138 can include an estimated date of arrival, delivery address, current location, and any other suitable information giving an indication of the status of the physical collateral or its progress to delivery to the user.

Collateral Generation System

Figure 2:
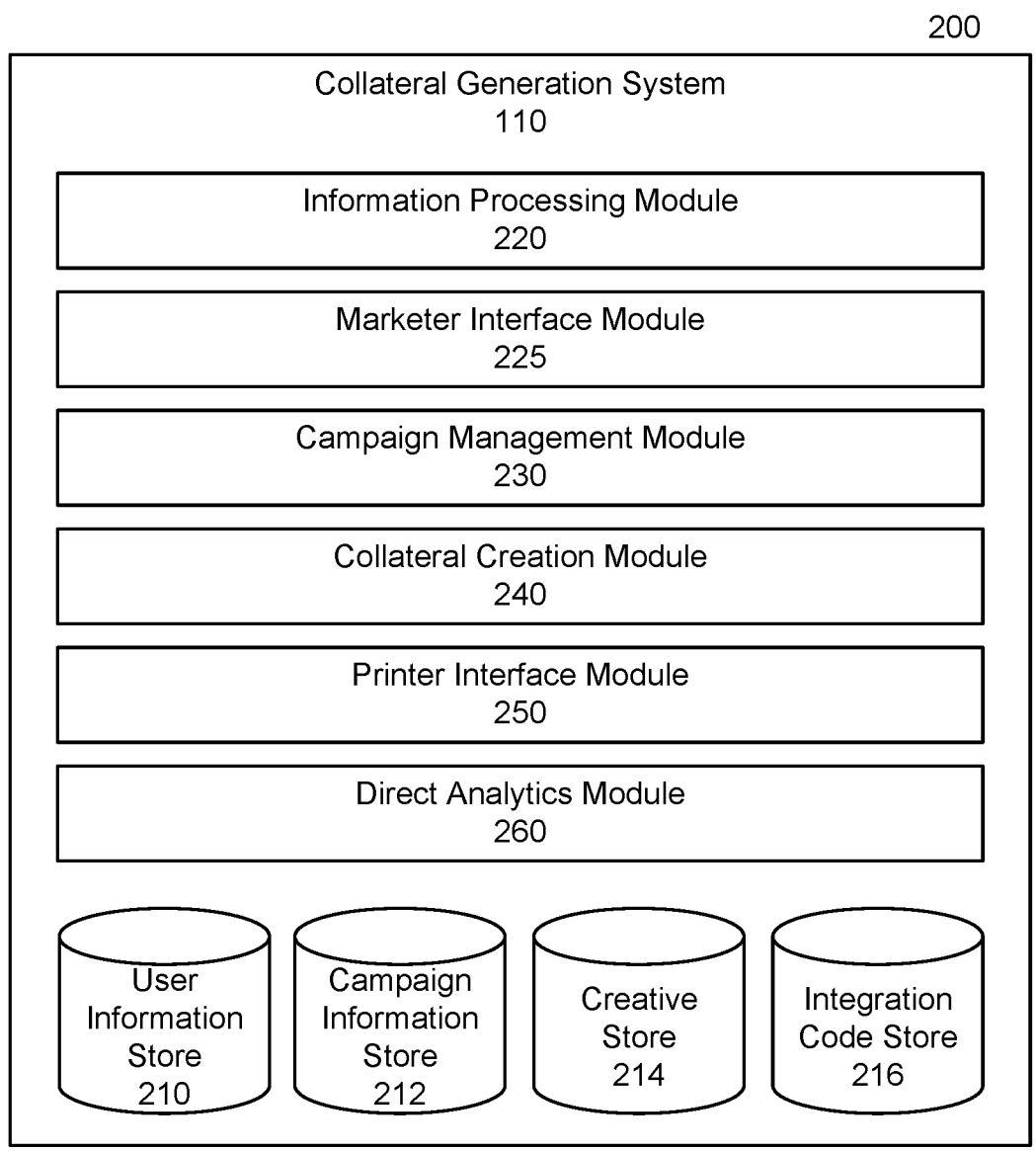
FIG. 2 is a block diagram illustrating an example collateral generation system, according to one embodiment.

FIG. 2 is a block diagram illustrating an example collateral generation system, according to one embodiment. In the embodiment of FIG. 2, the collateral generation system 110 includes a user information store 210, campaign information store 212, creative store 214, and an integration code store 216. In this embodiment, the collateral generation system 110 also includes an information processing module 220, marketer interface module 225, campaign management module 230, collateral creation module 240, printer interface module 250, and direct analytics module 260. In other embodiments, the collateral generation system 110 can include additional, fewer, or different modules or stores than the ones depicted in FIG. 2. For example, the functions of multiple modules may be combined into one module, or the functions of one module may be split across multiple modules.

The user information store 210, in the example embodiment of FIG. 2, stores information gathered about users, in some embodiments both about known users 102 and prospects 106. For example, user information can be received from marketers 122, from user devices 104*a* and 104*b*, from an identification service 124, or from a combination of sources. User information of the user information store 210 may be stored in a database or any other suitable data storage system such as a system of user profiles or an address graph relating items of user information. The user information may be structured as a user profile of each user. In some implementations, known users 102 and prospects 106 are associated with a unique identifier (a user ID) used to refer that user. A user ID may be a number or other identifier identifying that specific user or identifying data associated with that user. In some embodiments, a user ID is assigned by the collateral generation system 110. An alternative or additional user ID can be provided from other sources, such as a marketer 122 or identification service 124. For example, user activity data received from a marketer website or a cookie on a user device 104*b* may include the user ID of a prospect 106 and various user attributes of the prospect 106. A user attribute is an item of user information identifying a specific characteristic of a user that may be used to target physical collateral mailings. In some embodiments, a user attribute includes demographic information about the user received from a marketer 122, identification service 124, another third party, or any other suitable source. User attributes may also contain marketer specific information, such as a "very important person" (VIP) status at a website associated with the marketer 122. The VIP status may, for example, correspond to memberships and/or loyalty programs specific to the marketer 122.

In some implementations, user profiles are used to store information in the user information store 210. Each user profile can be associated with a user ID and/or name of the associated user. A user profile also may contain contact information for the user, for example email addresses, phone numbers, or physical addresses for the user (in the case of a known user 102). Of the physical addresses, a single mailing address for the user may be selected, indicating the most likely address to which physical collateral intended for the user can be delivered. A user profile can additionally include information about interactions between the user and marketers 122 or the collateral generation system 110 (hereinafter "user activity data"). For example, activities of the user such as browsing and purchasing can be stored in a user profile. In some implementations, items of user information are each associated with an individual marketer 122 in association with which that user information was received. For example, user activity information may be associated with specific marketers 122 with which the user was interacting via an online website. Similarly, addresses, user attributes, and other user attributable information can be associated with one or more marketers 122 associated with the user information. In some embodiments, marketers 122 may elect to collaborate or group with other marketers within the collateral generation system 110. This collaboration may allow user information associated with one marketer 122 to be used in physical collateral generation for another collaborating marketer 122. For example, user address data can be shared between collaborating marketers 122; this can allow, for example, addresses for prospects 106 associated with one marketer 122 to be identified if the prospect 106 is known to another marketer collaborating with the first marketer 122. Further, user profiles can contain records of actions taken by the collateral generation system 110 related to that user, such as records of any physical collateral sent to the user.

In some implementations, users' personally identifiable information (PII) stored in the user information store 210, for example, a user's full name or mailing address, is obfuscated so that if the user information store 210 is breached, users' PII is not exposed. In some implementations, the user information store 210 stores anonymized identifiers that refer to a user's contact information or other PII, instead of directly storing the contact information or other user PII. Storing anonymized identifiers can maintain user privacy, because if the security of the user information store 210 is breached, an unauthorized individual cannot obtain the PII of the user from the stored anonymized identifiers. For example, an anonymized user identifier can be generated to represent a user in the user information store 210 if an existing user identifier associated with received contact information or user activity data include sensitive information or PII (e.g., if a brand uses users' email addresses as their brand IDs), with the associations between the sensitive information and the anonymized identifiers stored separately. Similarly, the user information store 210 can store a hash of contact information (such as a mailing address) based on a suitable hash function to obfuscate the contact information for storage in the user information store 210. User PII can be separately stored in a secure database with a higher degree of security than the user information store 210, because it includes PII (for example, users' mailing addresses). In some implementations, the secure database is a higher security portion of the user information store 210, but the secure data based can also be a separate database. The collateral generation system 110 can access the PII stored in secure database based on the anonymized identifiers in the user information store 210. In some implementations, the secure database is accessed relatively infrequently; for example, to retrieve mailing addresses for mail candidates. In some implementations, user profiles associated with prospects 106 do not contain PII about the prospects. In some implementations, prospects are not associated with full names, addresses, or other information that might directly identify the prospect. Instead, the user profile of a prospect 106 can contain general identifiable information, such as user attributes or other user activity information that does not directly identify the prospect 106 or contain their PII.

In other embodiments, user information is stored in an address graph. An address graph can be configured using rules programmed on a computer to achieve the desired behavior, such as the behavior described herein. In general, an address graph has nodes, each representing a distinct item of user information, which are linked to related nodes based on the relationship between the user information of each node. Each node of the address graph may have user information, connections with related nodes, and other identifying information, such as an associated publisher or marketer. An address graph may be traversed to determine associations between various nodes of the address graph. An address graph may be stored within the collateral generation system 110 by any suitable by any suitable method, such as a database or table structure. As described above, the user information stored in the address graph can be obfuscated so that if the address graph is breached, users' PII is not exposed. For example, anonymized identifiers and hashed mailing addresses can be used in place of a full name or address in the address graph to obfuscate users' contact information. The associated full names and/or addresses can later be retrieved from a secure database when needed to generate physical collateral.

The campaign information store 212 can store information received from marketers 122. For example, the campaign information store 212 stores collateral objectives and campaign goals associated with a marketer 122. In some embodiments, marketers 122 may provide ranks or scores indicating the desirability of collateral objectives to the marketer 122; these ranks or scores can be stored in the campaign information store 212. Similarly, the campaign information store 212 may store associations between marketers 122, for example, collaboration instructions to share user information such as user addresses between associated marketers 122. A marketer 122 may rank pages displaying products within a website to indicate which products to prioritize when sending physical collateral, such as in a page hierarchy of a website associated with the marketer 122. Similarly, the campaign information store 212 also can store incentives that can be offered though physical collateral, for example, a discount or promotional code and targeting information for selecting users to be mailed physical collateral. For example, targeting information may be based on demographics or user attributes, and comprise positive targeting information specifying desired qualities of users to be mailed to and negative qualities to avoid when mailing physical collateral.

The creative element store 214, in some example embodiments, may store creative elements used to generate physical collateral plans. Creative elements may include images, text, templates, and any other suitable information. For example, the creative element store 214 may include a product photo, a product name, and a template describing a postcard. For example, a template can include physical characteristics of a physical collateral item, such as dimensions or a type of paper (e.g. cardstock) the physical collateral item will be printed on. In some implementations, a template may be a premade physical collateral plan defining a form factor, and including images, text, and wildcard fields indicating places where data is to be inserted. In other embodiments, a template may define a form factor only, and other content in the physical collateral plan is dynamically assembled using other creative elements.

According to some embodiments, the integration code store 216 can store integration code that the collateral generation system 110 can provide to marketers 122 to be integrated into websites associated with the marketer 122. Integration code can be embedded into marketer websites to transmit user activity data back to the collateral generation system 110. For example, integration code can relay user activity data based on what page of the marketer website the integration code is embedded on and/or based on the actions of the user on the marketer website. As described above, this user activity data can be added to the user information store 210. In addition, the integration code from the integration code store 216 can cause the user device 104a or 104b, or a web server providing the website, to transmit a request to the identification service 124 to provide information identifying a user, i.e., a known user 102 or prospect 106, to the collateral generation system 110. In response, the identification service 124 provides the collateral generation system 110 with information identifying the known user 102 or prospect 106, such as a unique identifier used by the identification service 124. The collateral generation system 110 can use the identifying information provided by the identification service 124 to associate the user with a particular known user 102. Alternatively, the collateral generation system 110 can use the identifying information provided by the identification service 124 to look up an address associated with a prospect 106 from the identification service 124 or another address database.

The same integration code, or a second integration code, can enable the collateral generation system 110 to detect transactions made by users on the marketer website, and to collect relevant user information about the transaction. For example, the transaction information transmitted responsive to the integration code can be used by the collateral generation system 110 to determine conversions for mailed prospects. This integration code may be responsive to actions in a shopping cart, checkout page, confirmation page of the marketer's website, for example. For example, the integration code can send transaction information (such as information about a purchased product or service and a quantity purchased, and information for identifying the user who made the purchase) to the collateral generation system 110 when the integration code detects a purchase.

The information processing module 220 receives information from user devices 104, marketers 122, identification services 124, and other appropriate sources, according some embodiments. Received information can be associated with known users 102, prospects 106, user devices 104, marketers 122, or any combination of the above. For example, the information processing module 220 can receive user activity or purchase information from a marketer 122 associated with a user, for example, user activity information of a known user 102 logged in to a marketer website can be linked to a user ID of the known user 102. Users also may be recognized based on a device ID of an associated device, through analysis of the user activity data itself, or through any other suitable method. Similarly, the information processing module 220 may receive user activity information from user devices 104. Information received from a user device 104 can also be associated with a device ID indicating which device the information was received from. In some embodiments, received user activity data is sent by the collateral generation system 110 to the identification service 124, which returns an appropriate user ID with which to associate the user activity data. Based on whether the received user activity data is associated with a known user 102 or a prospect 106 different processes can be followed to generate physical collateral for a user. User activity data associated with prospects 106 can be processed according to the processes described herein, while user activity data associated with known users 102 can be handled according to a different process, according to some embodiments. For example, U.S. patent application Ser. No. 15/382,086, filed Dec. 16, 2016, describes an example process for sending physical collateral to known users, the content of which is incorporated by reference it its entirety.

The received user activity data can be stored in a user profile associated with the user for later reference by the collateral generation system 110 when generating physical collateral. In some example implementations, received information may be stored in an address graph in nodes connected to each other and preexisting nodes based on the relationships between the received information and existing information in the address graph. The information processing module 220 can also generate hash values from received contact information or user activity data based on a hash function. The hashes can be used within the user information store 210 as anonymized identifiers, or to assist with matching contact information received from various sources, for example, by comparing hash values between two addresses to determine if the addresses match. For example, the information processing module 220 may receive address information from brands, immediately transform the provided addresses to hashed addresses (and delete the received addresses or store them in a separate secure database), and compare the hashes of the addresses provided by the brand to hashed addresses stored in the user information store 210 to identify connections between brand data and previously received contact information or user activity data.

In some implementations, the information processing module 220 checks received information prior to storing it. For example, received user information may be verified by cross checking with other received user information associated with the same user. Known users 102 or prospects 106 may be associated with multiple user devices 104*a* or 104*b*, for example, a known user 102 could be associated with both a smartphone and a laptop. In some implementations, user devices 104*a* and 104*b* of users 102 and 106 are not linked in the collateral generation system, for example, when a user begins using a new or different user device 104*a* or 104*b*. In the case where a user begins using a new user device 104*a* or 104*b*, the information processing module 220 may, for example, compare information associated with the newer device with information obtained from the previous device and determine that the newer device should also be associated with the user. In some implementations, the information processing module 220 optimizes an address graph, for example by pruning nodes and connections unlikely to be significant.

The information processing module 220 receives batches of information about known users 102 from the marketer 122, according to some embodiments. For example, the collateral generation system 110 can periodically receive a list of information about known users 102 (including, for example, user activity data, mailing addresses, and user attributes of the known users 102) for reference when generating physical collateral. Prior to storing the received information in the user information store, the information processing module can upload the received batch of information to the identification service 124 to determine an associated user ID for each user included in the list.

In some embodiments, the marketer interface module 225 allows marketers 122 to manage campaigns, set collateral objectives and campaign goals, and receive analysis results. The collateral generation system 110 can display a user interface to a marketer 122 for the marketer 122 to manage campaigns (for example, by adding or modifying collateral objectives) and receive analysis. For example, a marketer 122 can associate certain pages of a marketer website with specific collateral objectives or define campaign goals for a campaign by communicating with the collateral generation system 110 through the marketer interface module 225. For example, a marketer 122 can associate a specific page of a marketer website displaying a basketball sneaker with a collateral objective of a campaign to boost athletic shoe sales. Similarly, the marketer 122 can receive analysis results through the marketer interface module 225.

The campaign management module 230 selects users, collateral objectives, and incentives for which physical collateral will be generated, according to the embodiment of FIG. 2. Users may be selected to receive physical collateral based on user demographics, user attributes, and/or associations with a collateral objective, for example, membership in a relevant demographic group, possession of a relevant user attribute, or online activity relevant to a collateral objective. For example, a known user 102 can be selected to receive physical collateral based on user activity data showing that the user has recently viewed a product on a website associated with a collateral objective and that the user is a VIP member with the associated marketer. Similarly, a prospect 106 can be selected to receive physical collateral based on user activity data showing that the prospect 106 has recently viewed a specific product related to an advertising campaign or collateral objective of the marketer 122. The campaign management module 230 can then select a collateral objective and incentive for the user. The campaign management module 230 is discussed in further detail in reference to FIG. 3.

The collateral creation module, in the embodiment of FIG. 2, assembles physical collateral plans based on a selected user and incentive. In some embodiments, the collateral creation module may assemble creative elements from the creative element store 214 and relevant user information, such as an address or name, to form a physical collateral plan. The collateral creation module 240 is discussed in further detail in reference to FIG. 4.

The printer interface module 250 communicates with printers 130 over the printer interface 132, according to some embodiments. For example, the printer interface module 250 can provide physical collateral plans to printers 130. In some cases, printers 130 require specific formats and, in some embodiments, the printer interface module 250 can convert the format of a physical collateral plan based on which printer 130 the physical collateral plan will be sent to. The printer interface module 250 may send physical collateral plans to printers 130 by any suitable method required by the printer 130, such as email or over a suitable file transfer protocol (FTP).

The direct analytics module 260 analyzes received user activity data and physical collateral tracking information to determine statistics or analysis about a specific physical collateral item, a collateral objective, or a campaign goal. To determine if a user has responded to the physical collateral mailing the direct analytics module 260 may analyze user activity associated with a user and tracking information associated with a specific physical collateral item mailed to the user. In some implementations, a user is considered to have responded to a physical collateral mailing if they return to the marketer 122's website or store within a threshold amount of time from receiving the mailing. Similarly, a user can be considered a "conversion" each time they interact with the marketer 122 within a threshold amount of time from receiving the mailing. In some cases, conversions may be based on user purchases from an online store of a marketer 122. User purchases can be determined based on information received from the marketer 122 or user, for example, linked to a marketer ID, device ID, or other user ID.

In some embodiments, a marketer 122 can periodically provide a list of addresses (for example, shipping and/or billing addresses) associated with purchases from the marketer 122 to the collateral generation system 110. The list of addresses can then be associated with user IDs, for example based on information from the user information store 210, or based on requests to the identification service 124. The resulting list of user IDs can be cross referenced with the user IDs which have been recently mailed by the collateral generation system 110 to detect conversions. Conversions can also be detected based on information received from an integration code embedded on a confirmation page of a marketer website (for example a "thank you" page after a user has completed a purchase on a marketer website).

In some embodiments, information in an address graph is used to determine conversions based on user activity information added to the address graph. For example, the address graph can be traversed starting from user activity information representing a conversion to find user IDs, marketer IDs, or device IDs associated with a previous mailing.

In some embodiments, the direct analytics module 260 also generates overall statistics about a collateral objective or campaign goal across a wide range of users. User response or conversion data can be compiled by the direct analytics module 260 to generate response and conversion statistics. For example, user response data may be compared to the total number of users mailed physical collateral to determine a response percentage. The direct analytics module 260 also may utilize other user, marketer, or publisher information to generate more detailed statistics, for example, the direct analytics module 260 can use geographic data (for example the mailing address of a user) to generate localized response and conversion statistics. Response and conversion statistics may be organized by state, by county, by date, or by any other suitable method and can represent overall response and conversion rates for a publisher, response and conversion rates for a specific collateral objective or incentive, or by any other suitable method. In some implementations, these statistics may be displayed using a map, such as a heatmap with high conversion or response rates in one color, and low conversion or response rates in a different or contrasting color.

Campaign Management

Figure 3:
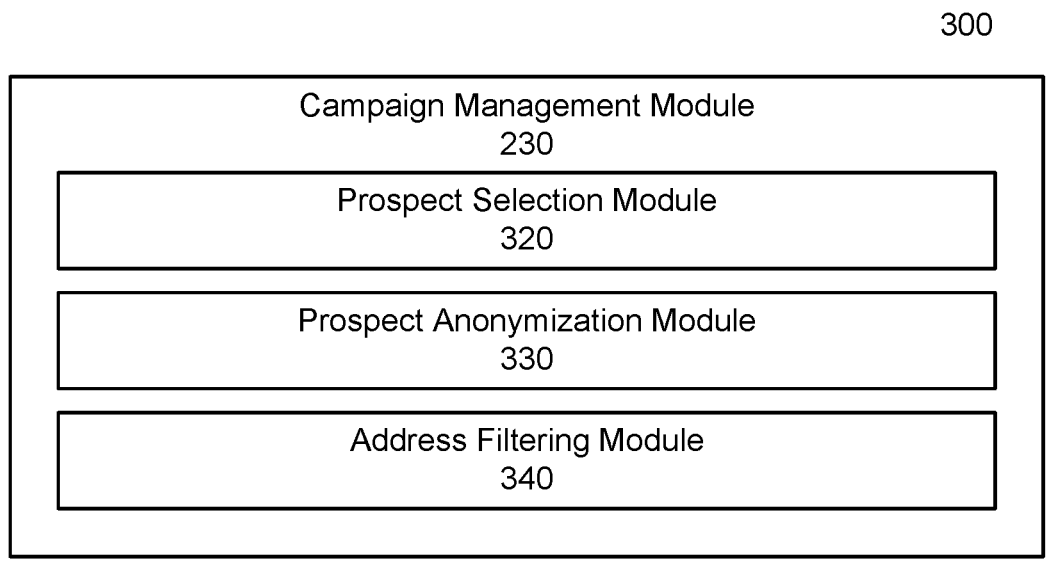
FIG. 3 is a block diagram illustrating an example campaign management module, according to one embodiment.

FIG. 3 is a block diagram illustrating an example campaign management module, according to one embodiment. In the embodiment of FIG. 3, the campaign management module 230 includes a prospect selection module 320, a prospect anonymization module 330, and an address filtering module 340. In other embodiments, the campaign management module 230 can include additional, fewer, or different modules. For example, the campaign management module 230 can include additional modules to select known users 102 to receive physical collateral. The campaign management module 230 may select users to receive physical collateral and determine which collateral objectives and incentives that mailing will follow. The selection of known users 102 and prospects 106 may be based on the associated marketer's campaign goals and collateral objectives as well as collected user data, for example user activity data suggesting an association with a collateral objective or available demographic or location data about the user. The selection of collateral objectives may be based on user association, campaign goals, and marketer ranking of the collateral objectives.

The prospect selection module 320, according to some embodiments, selects prospects 106 to potentially receive physical direct mail based on the campaign goals of one or more marketers 122 and information about the prospects 106. In some embodiments, a set of prospects 106 (for example, identified by user ID) for which user activity data has been recently received can be periodically (e.g., daily) retrieved by the prospect selection module 320. A prospect 106 can be selected to receive physical collateral associated with a specific marketer campaign based on demographic information, user attributes, or association with one or more collateral objectives of the marketer 122. For example, if a user profile associated with a prospect 106 contains user activity data that the user has viewed but not purchased a product on a marketer's 122 website, the prospect selection module 320 may select that prospect 106 as a candidate for a marketing campaign related to that product or a related product.

In some implementations, the campaign management module 230 determines which collateral objectives to associate with a prospect 106. The campaign management module 230 assigns scores to each prospect 106 based on a weighting function and selecting users ranked above a threshold number for a collateral objective. If a prospect 106 could be mailed for more than one collateral objective, a single campaign can be selected based on a campaign hierarchy ranking the desirability or importance of campaigns to the marketer 122. In situations where a selected prospect 106 is associated with multiple collateral objectives, for example multiple products or product lines sold by a marketer 122, the campaign management module 230 may select which collateral objective or objectives to associate with the physical collateral mail. Selection of collateral objectives can be based in part on marketer campaign goals, for example, a marketer-provided ranking of collateral objectives. For example, a low ranked objective may be selected over a higher ranked one if the user is more strongly associated with the lower ranked objective. Similarly, collateral objectives can be associated with specific products or services. In some embodiments, the selection of collateral objectives is based on the stock level of products associated with each collateral objective. This information can be received from marketers 122 and stored in the campaign information store 212. Similarly, collateral objectives can be chosen based on the price or profit margin of the associated products. In embodiments where a single physical collateral item is associated with multiple marketers, collateral objectives for a prospect 106 can be selected based on marketer association. Alternatively, all prospects 106 with a score above a threshold number may be selected to potentially receive physical collateral.

After each prospect 106 is associated with a collateral objective, the prospect selection module 320 filters the prospects 106 to narrow the range of prospects to a set of eligible prospects to potentially mail, according to some example embodiments. In some example embodiments, positive or negative targeting criteria may be used to select eligible prospects 106 for physical collateral mailings. For example, a prospect can be filtered based on user attributes (for example, "VIP" status or demographic attributes), location (for example, based on IP address), or other relevant statistics (such as if and how recently the prospect 106 has been mailed). In some implementations, if the received user activity information for a prospect 106 shows a conversion, the prospect is filtered out and/or considered a known user 102 for mailing purposes. For example, information about purchases tracked using the integration code can be used to identify known users 102 and remove them from the pool of prospects 106. Similarly, recently mailed prospects 106 can be filtered out (even across marketers 122 or collateral objectives), to avoid sending excessive amounts of mail to any user.

Prospects 106 can also be filtered based on the campaign goals of a marketer 122 or other properties of a campaign. For example, if a marketer-set target for mailings about a specific promotion or collateral objective is met, the user selection module 320 can consequently stop selecting users associated with that incentive or collateral objective. Similarly, prospects 106 may be filtered out if the budget for a specific campaign (or collateral objective) has been met or nearly met. Further, some campaigns or marketers 122 may require control groups of prospects 106 to aid in analyzing the impact of the campaign. For these implementations, additional prospects 106 may be assigned to one or more control groups (and consequently not mailed). In some implementations, the control prospects may be further monitored (for example to determine a control conversion rate) for analysis purposes. After filtering the list of prospects 106, the prospect selection module can generate a preliminary mailing list of prospects 106 to be anonymized and mailed.

The prospect anonymization module 330, according to some example embodiments, anonymizes the list of prospects 106 and generates a corresponding list of anonymized mailing addresses. In some implementations, the prospects 106 are anonymized prior to association with a mailing address to preserve the privacy of the prospects' mailing addresses or other PII. For example, the prospects 106 of the preliminary mailing list can be divided into blocks and a corresponding list of mailing addresses can be associated with each block rather than with individual prospects 106. Using the block method, it is difficult to determine the exact mailing address of any one prospect 106, as each mailing address associated with the block could be the mailing address of any prospect 106 associated with the block. Therefore, the block method maintains user anonymity by preventing the association of specific user activity information of a specific prospect 106 (such as user activity information received from a marketer 122 or user device 104) with the specific mailing address of the prospect 106.

Blocks can be comprised of 50, 100, or any suitable number of prospects 106 required to maintain anonymity. As each prospect 106 associated with a block receives largely the same physical collateral according to some embodiments, blocks can be organized based on any suitable factor, such as by collateral objective, location, and/or user attribute. After generating a set of prospect blocks from the preliminary mailing list, the remaining prospects in the preliminary mailing list can be filtered out to maintain anonymity if there are not enough remaining prospects to fully fill a block. In some embodiments, the identification service 124 is used to determine the correct mailing addresses for prospects 106. The prospect anonymization module 330 can send a list of user IDs associated with each block to the identification service 124, and the identification service 124 can return an anonymized list of mailing addresses associated with the prospects 106 in the block. Each mailing address is then normalized (for example through a United States Postal Service (USPS) database or any other suitable method) to find the canonical mailing address, according to some embodiment. This process can be repeated for each block to generate an updated mailing list of addresses.

In some embodiments, the address filtering module 340 further filters the updated mailing list based on the contained addresses. For example, the list of mailing addresses can be hashed and compared to the hashed mailing addresses of known users 102 stored in the user information store 210 (as described above) and any matching addresses can be discarded. Similarly, the list of mailing addresses can be matched against a blacklist of addresses (for example, comprising addresses from a do not call or do not mail registry or other suitable source) by comparing hash values (or through any other suitable method) and any matching addresses can be similarly discarded. Then the address filtering module 340 can compile the final mailing list of addresses to receive physical collateral. In some implementations, each mailing list comprises physical collateral associated with one marketer 122, and the process is repeated for each marketer 122.

Collateral Creation

Figure 4:
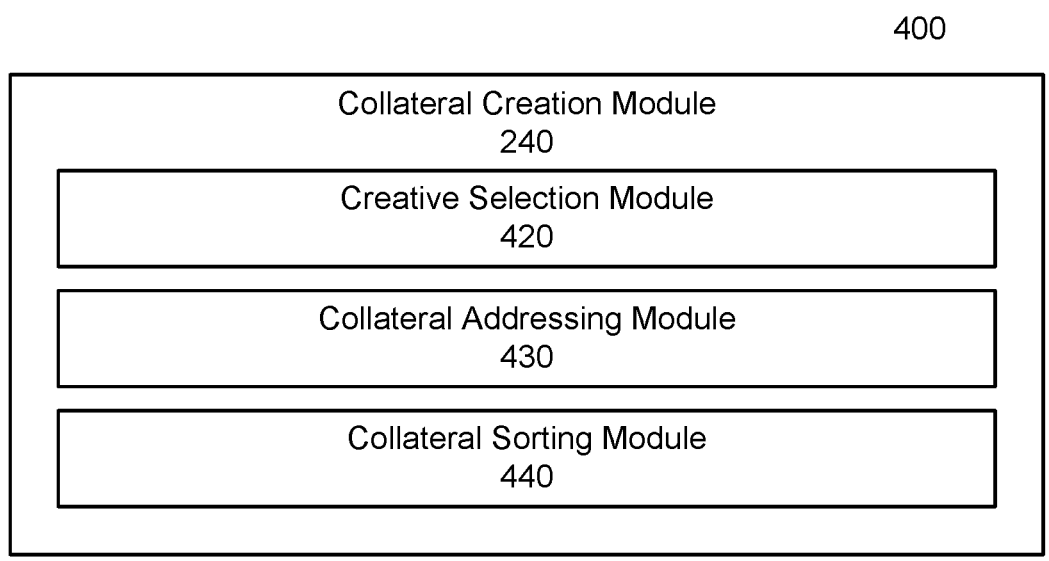
FIG. 4 is a block diagram illustrating an example collateral creation module, according to one embodiment.

FIG. 4 is a block diagram illustrating an example collateral creation module, according to one embodiment. In the embodiment of FIG. 4, the collateral creation module 240 includes a creative selection module 420, a collateral addressing module 430, and a collateral sorting module 440. In other embodiments, the campaign management module can include additional, fewer, or different modules. The collateral creation module 240 can receive a selection of a known user 102, a prospect 106, or a block of prospects 106; a collateral objective; and an incentive. The collateral creation module 240 generates an appropriate physical collateral plan to be transmitted to a printer 130 based on this received information.

The creative selection module 420 selects and, in some embodiments, assembles creative elements and user data to form a physical collateral plan. For example, after receiving a selection of a user or block of users, collateral objective, associated marketer, and incentive if applicable, the creative element matching module 420 may select a template and other creative elements based on the received information. For example, a collateral objective may be associated with a specific form factor, for example a postcard, and marketer, for example a hiking equipment manufacturer, and the creative element matching module 420 may select a template based on this restriction. In some implementations, templates require all wildcards to be filled out to appear as intended, in these cases the absence of a field may leave an unintended space in text or render the physical collateral plan nonsensical. Alternatively, a template can dynamically adapt to available information, such as by adjusting content based on missing information for a wildcard field. For example, a dynamic template featuring a product photo may rearrange, change, or enlarge surrounding text if a suitable product photo is not available. In some implementations, templates have no wildcard fields and define only a form factor of the physical collateral item. In these implementations, the physical collateral plan can be assembled out of non-template creative elements based on user information, collateral objective, incentive, and associated campaign goals.

Figure 5:
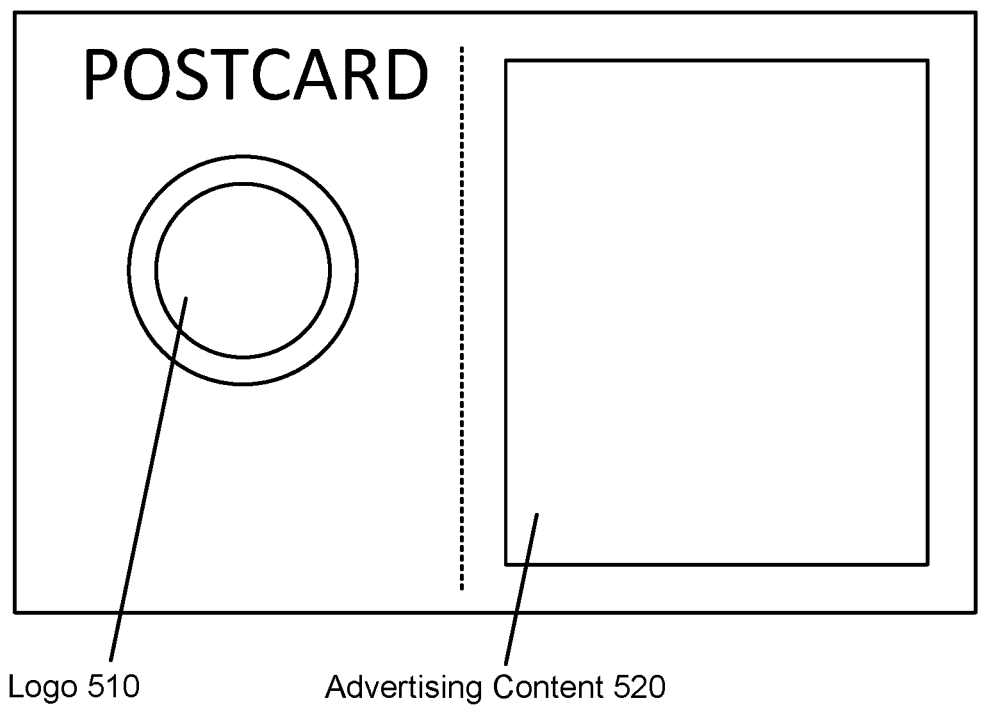
FIG. 5 illustrates an example physical collateral item associated with a marketer, according to one embodiment.

FIG. 5 illustrates an example physical collateral item associated with a marketer, according to one embodiment. The physical collateral item 500 shown in FIG. 5 is a postcard with a logo 510 and advertising content 520. The logo 510 may be the logo of the marketer associated with the physical collateral item 500. An address of a recipient may be printed below the logo 510 or in another position. In this example, the advertising content 520 is advertising content associated with the marketer. The postcard 500 can have different arrangements; for example, the logo 510 and advertising content 520 can be positioned on the left half of the card, and a return address and recipient address can be positioned on the right half of the card. The reverse side of the postcard (not shown in FIG. 5) may also have advertising content; for example, the main advertising content may be printed on the reverse side of the postcard, and advertisement content 520 may be secondary advertising content, such as information and terms of a promotion. In the embodiment of FIG. 5, the physical collateral item 500 is a postcard, though a physical collateral item associated with a marketer can also be a catalog, letter, or other physical collateral item.

Returning to FIG. 4, in an embodiment, the collateral addressing module 430 inserts or verifies mailing addresses, tracking barcodes, and return addresses into physical collateral plans. In some implementations, mailing addresses may be verified by the collateral addressing module before being inserted into the physical collateral plan. For example a mailing address may be verified against a database such as the National Change Of Address database (NCOA), and the address format may be checked and corrected, for instance by a CASS (Coding Accuracy Support System) certified matching process. The collateral addressing module 430 may insert an appropriate tracking barcode, QR code, or other tracker or identifier based on the mail service 134 to be used. A return address may be dynamically selected for each physical collateral item based on the marketer 122 or marketer rules provided by the marketer, the mailing address of the user, or for any other suitable reason. In some implementations, an address associated with the collateral generation system is an option for the return address.

The collateral sorting module 440 may associate physical collateral plans with printers 130 and determine a correct order or sorting of the physical collateral plans, according to the example embodiment of FIG. 4. As discussed above, a collateral generation system 110 may be connected to multiple printers 130. These printers may differ in geographic location and generating a physical collateral item closer to its final destination may result in more efficient delivery, both in cost to deliver and time to delivery. Consequently, in some implementations the collateral sorting module 440 may assign physical collateral plans to different printers based on geographic location, estimated time to delivery, estimated cost of delivery, or other suitable factors. Physical collateral plans received by the collateral generation system may be split between any number of associated printers 130. As physical collateral plans may fully describe the physical collateral item, for example including a verified address of the recipient, in some embodiments, printers 130 have only to print the file as given and deliver it to the appropriate mail service 134. Similarly, as discussed above, a mail service 134 may allow pre-sorting of mail to further increase efficiency. In some implementations, the collateral sorting module can also pre-sort the physical collateral plans so printed physical collateral will be in sorted order. For example, a mail service 134, such as the USPS, may allow mail to be pre-sorted by carrier route. In some embodiments, the functions of the collateral sorting module 440 may be separated across two modules, a printer routing module and a route sorting module. In these embodiments, the printer routing module may direct pieces of physical collateral to different printers 130 based on location, cost, or other factors, and the route sorting module can pre-sort physical collateral plans for the mail services 134.

Example Processes for Sending Physical Collateral to Prospects

Figure 6:
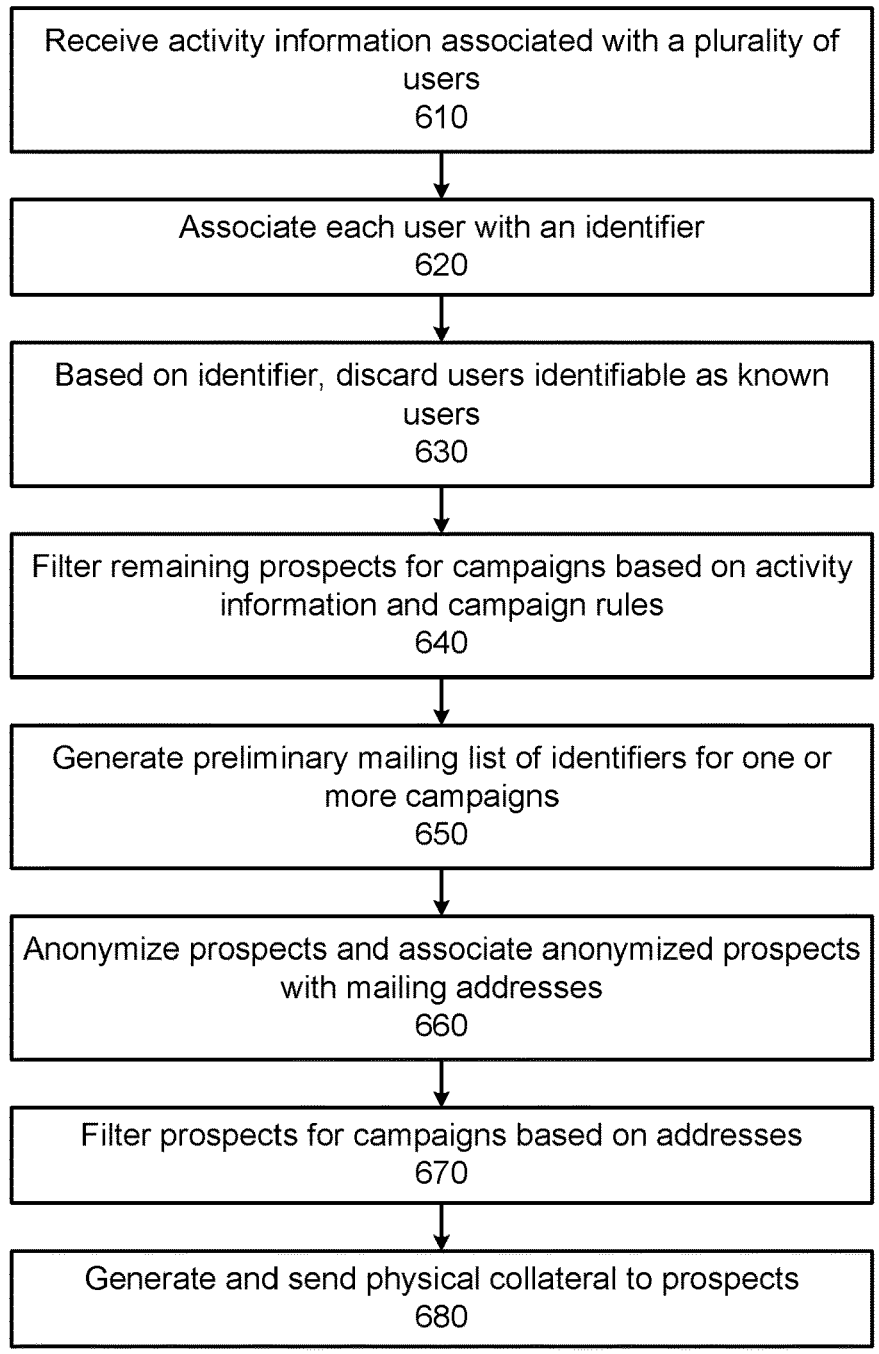
FIG. 6 is a flowchart showing a process for generating and mailing physical collateral to prospects, according to one embodiment.

FIG. 6 illustrates an example process for generating and mailing physical collateral to prospects, according to one embodiment. Process 600 begins with the collateral generation system receiving 610, for example from a marketer, user activity information associated with a plurality of users. For example, the user activity information can contain user activity information of both known users and prospects. As described in relation to FIG. 2, the user activity information may be received from a user device based on instructions in an integration code embedded in the marketer's website. Based in part on the received user activity information, the collateral generation system (e.g., the prospect selection module 320) can determine eligible prospects to send physical collateral to, as described in relation to FIG. 3.

Each user of the plurality of users for whom activity information was received is associated 620 with an identifier, such as a user ID. For example, the received user activity information, which can include a cookie, IP address, user ID, or other identifying information, can be sent to an internal or external identification service (e.g., identification service 124), which determines and returns a unique user ID for each user. In other embodiments, the integration code embedded on the marketer's website can cause a request to the identification service 124 to provide a unique user ID for browsing users that is used by the collateral generation system 110 to identify prospects 106. In some embodiments, the identification service 124 transmits the user ID back to the device that is executing the integration code, e.g., the user device or a web server used for browsing. The integration code then causes the transmission of the user ID together with the user activity information to the collateral generation system 110.

Based on the received user IDs, the collateral generation module (e.g., the prospect selection module 320) discards 630 any users identified as known users 102 from the prospecting process. For example, the returned user IDs can contain user IDs corresponding to known users. In some implementations, physical collateral is generated and sent to known users 102 based on a separate process. A particular process for filtering known users from prospects is described with respect to FIG. 9. Once the known users are removed, the remaining users are treated as prospects.

The collateral generation module (e.g., the prospect selection module 320) filters 640 the remaining prospects based on the associated activity information and campaign rules, and generates 650 a preliminary mailing list of prospects. Prospect filtering is described in greater detail with respect to FIG. 7.

After generating the preliminary mailing list, the collateral generation module (e.g., the prospect anonymization module 330) anonymizes 660 the prospects, for example, into one or more blocks of prospects, and associates each block of prospects with a set mailing addresses. For example, blocks of user IDs are sent to the identification service 124, which can return a list of mailing addresses associated with the block. The collateral generation system 110 (e.g., the address filtering module 340) further filters 670 the remaining prospects, now associated with mailing addresses, based on the addresses. For example, the address filtering module 340 may compare the mailing addresses to the mailing addresses of known users 102 and to a blacklist of addresses not to mail. Finally, the collateral generation system 110 generates and sends 680 the physical collateral based on the final list of addresses.

Figure 7:
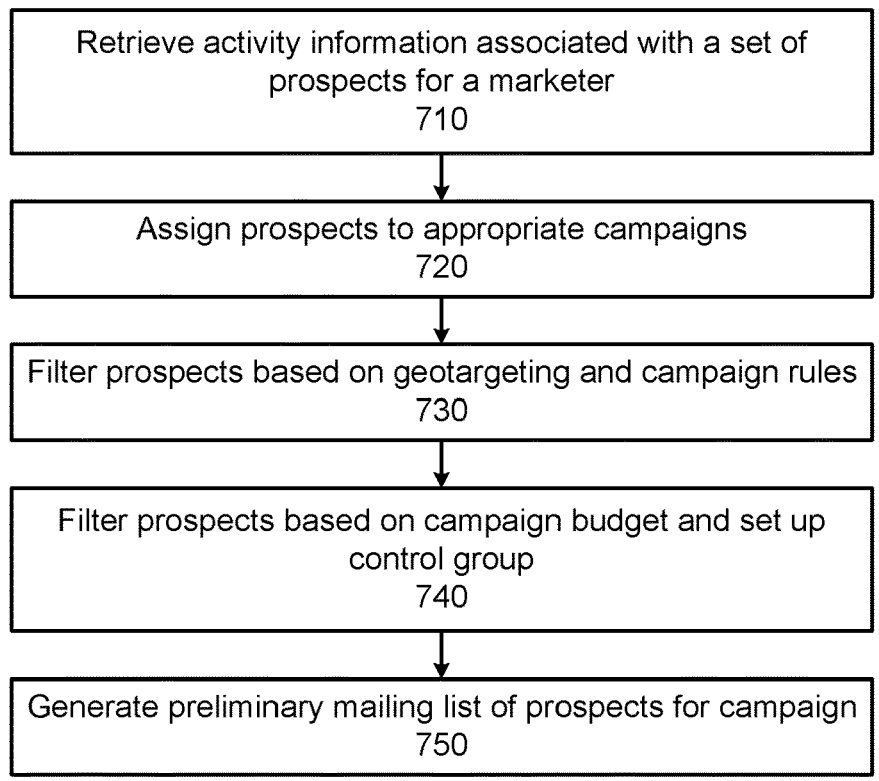
FIG. 7 is a flowchart showing a process for filtering prospects based on user activity information, according to one embodiment.

FIG. 7 illustrates an example process 700 for filtering prospects based on user activity information, according to one embodiment. The prospect selection module 320 retrieves 710 activity information associated with a set of prospects. In this embodiment, the set of prospects are each associated with the same marketer which can have a set of campaigns. The prospect selection module 320 then associates 720 each of the prospects with an appropriate campaign, for example associating each prospect with a collateral objective based on received user activity information, user attributes of the prospects, a campaign hierarchy, and any other suitable factors. As an example, if user activity information or information received from a marketer tags a prospect as a shoe-lover, the prospect selection module 320 can associate the prospect with a campaign related to shoes based on this tag. The prospect selection module 320 filters 730 the prospects based on targeting criteria of the associated campaign; for example prospects can be filtered based on geotargeting information (e.g., targeting a particular zip code or set of zip codes), or campaign rules for the associated campaign designating a particular type of prospect (e.g., prospects who viewed high end shoes). The prospect selection module 320 then further filters 740 the prospects associated with each campaign based on the campaign budget and, in some cases, sets a control group of prospects associated with the campaign. For example, if a campaign is associated with too many prospects (for example, such that the campaign would exceed a budget for mailing prospects this month), less desirable prospects can be discarded until the campaign would meet the budget. In some embodiments, the prospect selection module 320 can also filter prospects who have already been associated with another campaign. Then, a preliminary mailing list of prospects is generated 750 by the prospect selection module.

Figure 8:
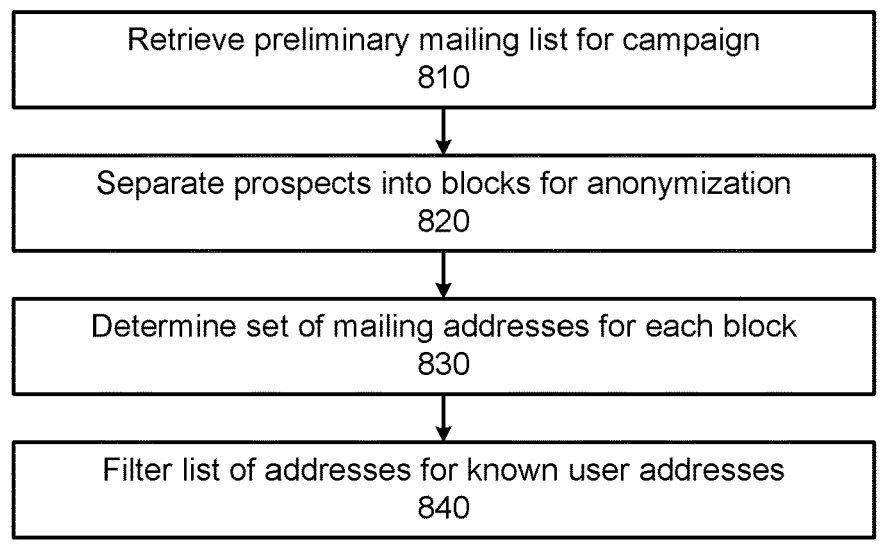
FIG. 8 is a flowchart showing a process for filtering prospects based on address, according to one embodiment.

FIG. 8 illustrates an example process 800 for filtering prospects based on address, according to one embodiment. The process 800 begins when the prospect anonymization module 330 retrieves 810 a preliminary mailing list for a campaign. The prospect anonymization module 330 then separates 820 the prospects into blocks for anonymization. For example, prospects can be separated into blocks can be of 50 or 100 prospects, where each prospect in a block is associated with the same campaign and/or collateral objective. Similarly, prospects can be separated into blocks based on user attributes or any other suitable factors. Next, the collateral generation system 110 can determine 830 the set of mailing addresses associated with the prospects in each block. In some embodiments, the collateral generation system sends information about each block of prospects to the identification service 124, and the identification service returns 124 a list of mailing addresses corresponding to the prospects in the block. Finally, the address filtering module 330 further filters 840 the list of addresses to remove any known user addresses or other un-mailable addresses.

Figure 9:
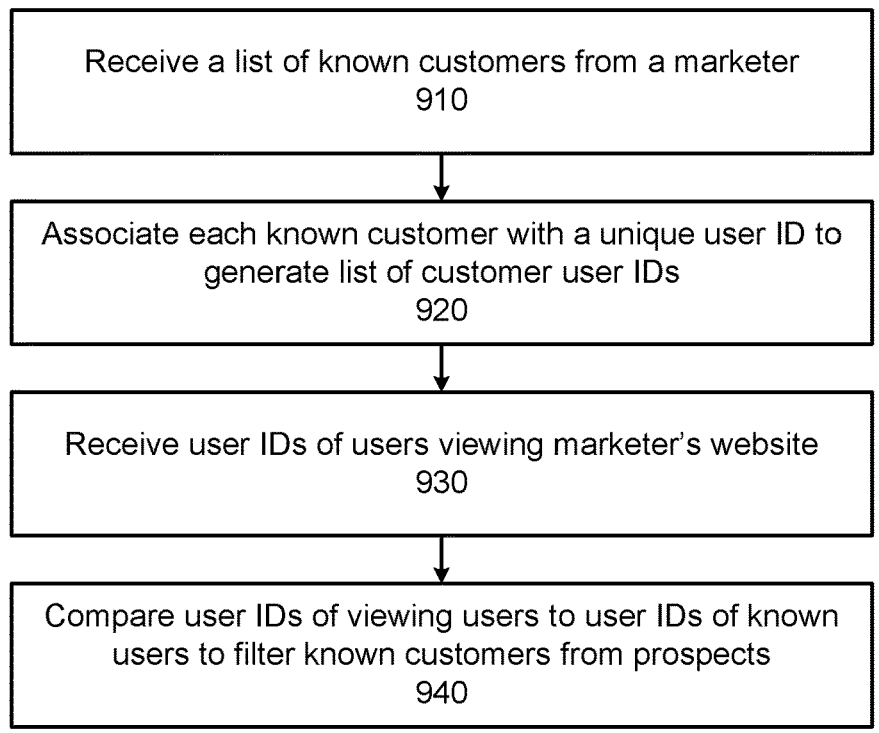
FIG. 9 is a flowchart showing a process for distinguishing known customers from prospects, according to one embodiment.

FIG. 9 is a flowchart showing a process 900 for distinguishing known users from prospects, according to one embodiment. The collateral generation system 110 receives 910 a list of known customers or other users from a marketer. The list may include, for example, names, addresses (including shipping addresses, billing addresses, work addresses former addresses, etc.), email addresses, phone numbers, or any other identifying information of the users. The list may include different sets of information for different customers (e.g., it may include a phone number for some but not all known customers). Then, the collateral generation system associates 920 each known customer in the received list with a unique user ID, generating a list of known customer user IDs. For example, the collateral generation system 110 can send relevant information about each user to an internal or external identification service 124, which associates the provided information with a user ID. The collateral generation system then receives 930 a list of user IDs of users that have viewed a marketer's website. The website may include an integration code that transmits a request the identification service 124 to provide a user ID for the browsing user based on information associated with the browsing user (e.g., an IP address, username, cookie, and/or other information); the user ID is then returned to the collateral generation system directly or via the user device or web server. The prospect selection module 320 compares 940 the user IDs of the users who viewed the website with the list of known user IDs to distinguish and filter out known users from unknown users, i.e., prospects 106.

Figure 10:
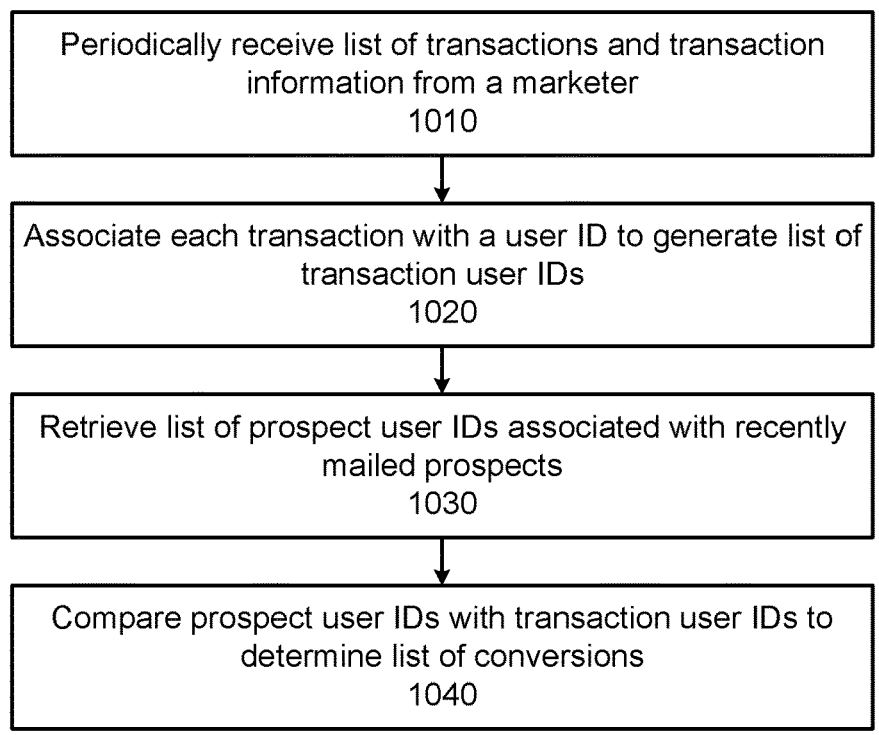
FIG. 10 is a flowchart showing a process for detecting conversion of mailed prospects, according to one embodiment.

FIG. 10 is a flowchart showing a process 1000 for detecting conversion of mailed prospects, according to one embodiment. The collateral generation system 110 receives 1010 a list of transactions with corresponding transaction information from a marketer. For example, a marketer can send a list of transactions along with transaction information such as a shipping or billing address associated with the transaction periodically (e.g. weekly or monthly). Then, the collateral generation system associates 1020 each transaction in the received list with a user ID, generating a list of transaction user IDs, each associated with a transaction. For example, the collateral generation system can send relevant transaction information about each transaction (such as an associated shipping or billing address) to an identification service which associates the provided information with a user ID. The collateral generation system then retrieves 1030 a list of user IDs associated with a recently mailed prospect ("prospect user IDs"), for example based on records stored by the collateral generation system. Finally, the direct analytics module compares 1040 the list of transaction user IDs with the list of prospect user IDs to detect conversions (i.e. prospects who were mailed and subsequently went on to make a purchase). For example, each match between a transaction user ID and a prospect user ID can represent a conversion. Alternatively, matching prospects and transactions can be additionally matched based on other criteria (such as transaction information about the type of product purchased in the transaction).

Additional Considerations

A collateral generation system 110 can provide many advantages to users 102 and marketers 122. In some implementations, a collateral generation system can generate and send physical collateral to prospects based on user actions or other data received that day or the day before. Similarly, collateral generation system 110 can personalize physical collateral items for a prospect 106 or an anonymized block of prospects 106 based on associated actions of the group of prospects 106. In this way, a prospect 106 can receive a physical collateral item relevant to their current situation both in content and in timing. Additionally, tracking and analytics information provided to marketers 122 from the collateral generation system 110 can allow marketers 122 to better manage any marketing campaigns or promotions involving physical collateral. For example, the results, measured in response or conversion rate, of physical collateral created using a collateral generation system 110 can be improved (for example, a higher response or conversion rate) when compared to a generic, non-personalized direct mail system.

Additionally, the collateral generation system 110 can efficiently distribute physical collateral to printers 130. Because physical collateral plans contain all information on associated physical collateral items, physical collateral associated with multiple marketers 122 and publishers 124 can be split among many printers 130 and mail services 134 for generation and delivery. In some embodiments, this allows printers to be selected based on cost, location, printing capability (for example, for unusual materials or form factors), or for any other suitable reason.

The disclosed configuration enables using periodically collected (e.g., daily) information for the purpose of generation of customized physical collateral on a large scale. Physical collateral can be generated based not only on personalization for the recipient, but also based on marketer rules, and other relevant user activity data, for example response or conversion data recently received from the intended recipient of the physical collateral, or from other recipients of similar physical collateral.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated and described through the FIGS. herein. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for sending direct mail to anonymized prospects through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for generating and sending direct mail to prospects, the method comprising:
   maintaining, at a collateral generation system, a set of known users of a first entity, each known user of the set of known users comprising a mailing address provided by the known user to the first entity;
   receiving, at the collateral generation system, online user activity information associated with a plurality of prospects, each prospect associated with the first entity and having a mailing address unknown to the first entity;
   determining, based on the online user activity information and a set of rules associated with the first entity, that the plurality of prospects are eligible to receive a mailing;
   associating each prospect in the plurality of prospects with one of a plurality of prospect blocks, each prospect block comprising greater than a threshold number of the plurality of prospects;
   transmitting, to an identification service, information about each prospect of a first prospect block of the plurality of prospect blocks, the identification service configured to determine a mailing address for each prospect of the first prospect block based on the information about the prospect;
   receiving, from the identification service, an anonymized list of mailing addresses associated with the first prospect block, each mailing address of the anonymized list of mailing addresses associated with the first prospect block and unassociated with individual prospects of the first prospect block;
   storing user information of a user in a user information store comprising,
      a first portion of the user information store storing: (1) user activity information of the user, and (2) an anonymized identifier determined based on a hashed mailing address of the user; and
      a second portion of the user information store representing a secure database implementing higher degree of security compared to the first portion of the user information store, wherein the second portion of the user information store is accessed relatively infrequently compared to the first portion of the user information store, the second portion of user information store storing personally identifiable information of the user including a mailing address of the user obfuscated using a hash function, wherein the personally identifiable information is accessed using the anonymized identifier of the user;
   performing address filtering to reduce the anonymized list of mailing addresses by:
      hashing each mailing address of the anonymized list of mailing addresses to obtain hash values;
      comparing the hash value of each mailing address of the anonymized list of mailing addresses with hashed mailing addresses of known users stored in the user information store; and
      modifying the anonymized list of mailing addresses by removing, from the anonymized list of mailing addresses, a first subset of hashed mailing addresses of known users stored in the user information store; and
   accessing mailing addresses of users corresponding to the modified anonymized list of mailing addresses from the secure database for providing physical collateral to users.

2. The method of claim 1, wherein determining, based on the online user activity information and the set of rules associated with the first entity, that the plurality of prospects are eligible to receive the mailing comprises:
   scoring each prospect of the plurality of prospects according to a weighting function associated with a collateral objective based on the online user activity information; and
   associating each prospect of the plurality of prospects with the collateral objective over one or more other collateral objectives based on the score and a campaign hierarchy of collateral objectives.

3. The method of claim 1, wherein determining, based on the online user activity information and the set of rules associated with the first entity, that the plurality of prospects are eligible to receive the mailing comprises:
  removing, from the plurality of prospects, one or more prospects based on at least one of: a user attribute of the prospect, a recent mailing associated with the prospect, or a location of the prospect.

4. The method of claim 1, wherein each prospect is a user associated with the first entity for which the first entity has insufficient information about the user to determine a mailing address for the user.

5. The method of claim 1, further comprising:
  receiving, from the first entity, transaction information describing a plurality of transactions associated with the first entity;
  associating each transaction of the plurality of transactions with a user ID based on the associated transaction information; and
  generating a list of conversions by matching one or more prospects of the plurality of prospects with one or more user IDs associated with a transaction of the plurality of transactions.

6. A non-transitory computer readable storage medium comprising instructions which, when executed by a processor, cause the processor to perform the steps of:
  maintaining, at a collateral generation system, a set of known users of a first entity, each known user of the set of known users comprising a mailing address provided by the known user to the first entity;
  receiving, at the collateral generation system, online user activity information associated with a plurality of prospects, each prospect associated with the first entity and having a mailing address unknown to the first entity;
  determining, based on the online user activity information and a set of rules associated with the first entity, that the plurality of prospects are eligible to receive a mailing;
  associating each prospect in the plurality of prospects with one of a plurality of prospect blocks, each prospect block comprising greater than a threshold number of the plurality of prospects;
  transmitting, to an identification service, information about each prospect of a first prospect block of the plurality of prospect blocks, the identification service configured to determine a mailing address for each prospect of the first prospect block based on the information about the prospect;
  receiving, from the identification service, an anonymized list of mailing addresses associated with the first prospect block, each mailing address of the anonymized list of mailing addresses associated with the first prospect block and unassociated with individual prospects of the first prospect block;
  storing user information of a user in a user information store comprising,
    a first portion of the user information store storing: (1) user activity information of the user, and (2) an anonymized identifier determined based on a hashed mailing address of the user; and
    a second portion of the user information store representing a secure database implementing higher degree of security compared to the first portion of the user information store, wherein the second portion of the user information store is accessed relatively infrequently compared to the first portion of the user information store, the second portion of user information store storing personally identifiable information of the user including a mailing address of the user obfuscated using a hash function, wherein the personally identifiable information is accessed using the anonymized identifier of the user;
  performing address filtering to reduce the anonymized list of mailing addresses by:
    hashing each mailing address of the anonymized list of mailing addresses using the hash function to obtain hash values;
    comparing the hash value of each mailing address of the anonymized list of mailing addresses with hashed mailing addresses of known users stored in the user information store; and
    modifying the anonymized list of mailing addresses by removing, from the anonymized list of mailing addresses, a first subset of hashed mailing addresses of known users stored in the user information store; and
  accessing mailing addresses of users corresponding to the modified anonymized list of mailing addresses from the secure database for providing physical collateral to users.

7. The non-transitory computer readable storage medium of claim 6, wherein determining, based on the online user activity information and the set of rules associated with the first entity, that the plurality of prospects are eligible to receive the mailing comprises:
  scoring each prospect of the plurality of prospects according to a weighting function associated with a collateral objective based on the online user activity information; and
  associating each prospect of the plurality of prospects with the collateral objective over one or more other collateral objectives based on the score and a campaign hierarchy of collateral objectives.

8. The non-transitory computer readable storage medium of claim 6, wherein determining, based on the online user activity information and the set of rules associated with the first entity, that the plurality of prospects are eligible to receive the mailing comprises:
  removing, from the plurality of prospects, one or more prospects based on at least one of: a user attribute of the prospect, a recent mailing associated with the prospect, or a location of the prospect.

9. The non-transitory computer readable storage medium of claim 6, wherein each prospect is a user associated with the first entity for which the first entity has insufficient information about the user to determine a mailing address for the user.

10. The non-transitory computer readable storage medium of claim 6, wherein the steps further comprise:
  receiving, from the first entity, transaction information describing a plurality of transactions associated with the first entity;
  associating each transaction of the plurality of transactions with a user ID based on the associated transaction information; and
  generating a list of conversions by matching one or more prospects of the plurality of prospects with one or more user IDs associated with a transaction of the plurality of transactions.

11. A computer system comprising:
  a processor; and
  a non-transitory computer readable storage medium comprising instructions which, when executed by the processor, cause the processor to perform the steps of:

maintaining, at a collateral generation system, a set of known users of a first entity, each known user of the set of known users comprising a mailing address provided by the known user to the first entity;

receiving, at the collateral generation system, online user activity information associated with a plurality of prospects, each prospect associated with the first entity and having a mailing address unknown to the first entity;

determining, based on the online user activity information and a set of rules associated with the first entity, that the plurality of prospects are eligible to receive a mailing;

associating each prospect in the plurality of prospects with one of a plurality of prospect blocks, each prospect block comprising greater than a threshold number of the plurality of prospects;

transmitting, to an identification service, information about each prospect of a first prospect block of the plurality of prospect blocks, the identification service configured to determine a mailing address for each prospect of the first prospect block based on the information about the prospect;

receiving, from the identification service, an anonymized list of mailing addresses associated with the first prospect block, each mailing address of the anonymized list of mailing addresses associated with the first prospect block and unassociated with individual prospects of the first prospect block;

storing user information of a user in a user information store comprising,
- a first portion of the user information store storing: (1) user activity information of the user, and (2) an anonymized identifier determined based on a hashed mailing address of the user; and
- a second portion of the user information store representing a secure database implementing higher degree of security compared to the first portion of the user information store, wherein the second portion of the user information store is accessed relatively infrequently compared to the first portion of the user information store, the second portion of user information store storing personally identifiable information of the user including a mailing address of the user obfuscated using a hash function, wherein the personally identifiable information is accessed using the anonymized identifier of the user;

performing address filtering to reduce the anonymized list of mailing addresses by:
- hashing each mailing address of the anonymized list of mailing addresses based on a hash function to obtain hash values;
- comparing the hash value of each mailing address of the anonymized list of mailing addresses with hashed mailing addresses of known users stored in the user information store; and
- modifying the anonymized list of mailing addresses by removing, from the anonymized list of mailing addresses, a first subset of mailing addresses of known users stored in the user information store; and accessing mailing addresses of users corresponding to the modified anonymized list of mailing addresses from the secure database for providing physical collateral to users.

12. The computer system of claim 11, wherein determining, based on the online user activity information and the set of rules associated with the first entity, that the plurality of prospects are eligible to receive the mailing comprises:

scoring each prospect of the plurality of prospects according to a weighting function associated with a collateral objective based on the online user activity information; and associating each prospect of the plurality of prospects with the collateral objective over one or more other collateral objectives based on the score and a campaign hierarchy of collateral objectives.

13. The computer system of claim 11, wherein determining, based on the online user activity information and the set of rules associated with the first entity, that the plurality of prospects are eligible to receive the mailing comprises:

removing, from the plurality of prospects, one or more prospects based on at least one of: a user attribute of the prospect, a recent mailing associated with the prospect, or a location of the prospect.

14. The computer system of claim 11, wherein each prospect is a user associated with the first entity for which the first entity has insufficient information about the user to determine a mailing address for the user.

15. The computer system of claim 11, wherein the steps further comprise:

receiving, from the first entity, transaction information describing a plurality of transactions associated with the first entity;

associating each transaction of the plurality of transactions with a user ID based on the associated transaction information; and generating a list of conversions by matching one or more prospects of the plurality of prospects with one or more user IDs associated with a transaction of the plurality of transactions.

* * * * *